United States Patent [19]
White

[11] Patent Number: 5,528,470
[45] Date of Patent: Jun. 18, 1996

[54] ILLUMINATED VANITY MIRROR ASSEMBLY FOR A VEHICULAR SUN VISOR

[75] Inventor: Jay R. White, Bloomfield Hills, Mich.

[73] Assignee: Jay Roberts Company, Bloomfield Hills, Mich.

[21] Appl. No.: 311,149

[22] Filed: Sep. 23, 1994

[51] Int. Cl.⁶ .................................................. B60Q 3/021
[52] U.S. Cl. .......................... 362/135; 362/142; 362/144
[58] Field of Search ..................................... 362/135, 136, 362/137, 142, 143, 144, 154, 155, 282, 287, 427; 296/97.1, 97.2

[56] References Cited

U.S. PATENT DOCUMENTS

| | | |
|---|---|---|
| 3,926,470 | 12/1975 | Marcus . |
| 4,000,404 | 12/1976 | Marcus . |
| 4,075,468 | 2/1978 | Marcus . |
| 4,174,864 | 11/1979 | Viertel et al. ............................ 362/144 |
| 4,213,169 | 7/1980 | Kempkers . |
| 4,227,241 | 10/1980 | Marcus . |
| 4,227,242 | 10/1980 | Marcus . |
| 4,352,518 | 10/1982 | Prince et al. . |
| 4,421,355 | 12/1983 | Marcus . |
| 4,491,899 | 1/1985 | Fleming . |
| 4,494,789 | 1/1985 | Flowerday . |
| 4,570,990 | 2/1986 | Flowerday . |
| 4,586,788 | 5/1986 | Hansen . |
| 4,648,011 | 3/1987 | Boote et al. . |
| 4,734,831 | 3/1988 | Keyser et al. . |
| 4,760,503 | 7/1988 | VandenBerge et al. . |
| 4,794,497 | 12/1988 | Jonsas et al. ............................ 362/143 |
| 4,847,737 | 7/1989 | VanOrder et al. . |
| 4,979,079 | 12/1990 | Tawaraya ............................... 362/135 |
| 4,984,137 | 1/1991 | Maemura ................................ 362/74 |

FOREIGN PATENT DOCUMENTS

| | | | |
|---|---|---|---|
| 860512 | 1/1941 | France ................................... 362/137 |

*Primary Examiner*—Denise L. Gromada
*Assistant Examiner*—Y. Quach
*Attorney, Agent, or Firm*—Gifford, Krass, Groh, Sprinkle, Patmore, Anderson & Citkowski

[57] ABSTRACT

An illuminated vanity mirror assembly is provided for snap mounting in a vehicular sun visor. A cover is hinged to a base member carrying the mirror for opening rotation along an axis parallel to the swinging axis of the visor with the cover containing the lighting. In a preferred embodiment the assembly has a round compact shape.

7 Claims, 3 Drawing Sheets

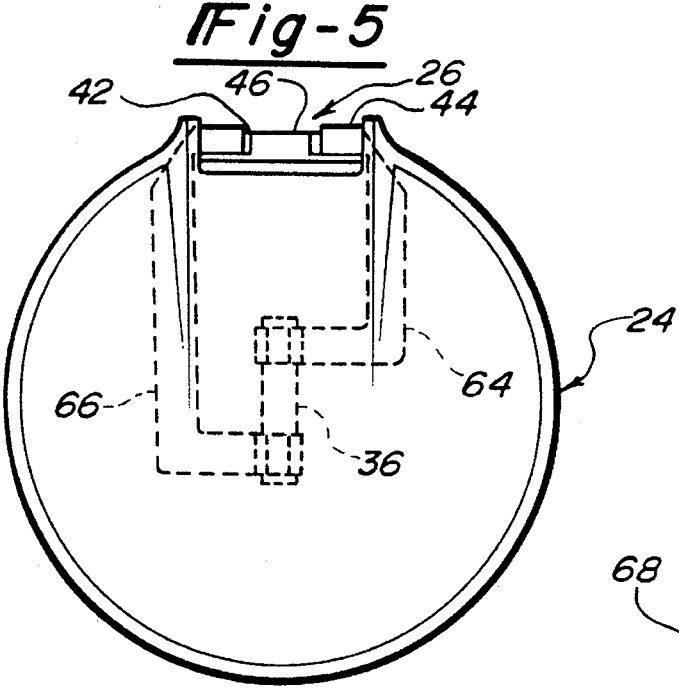
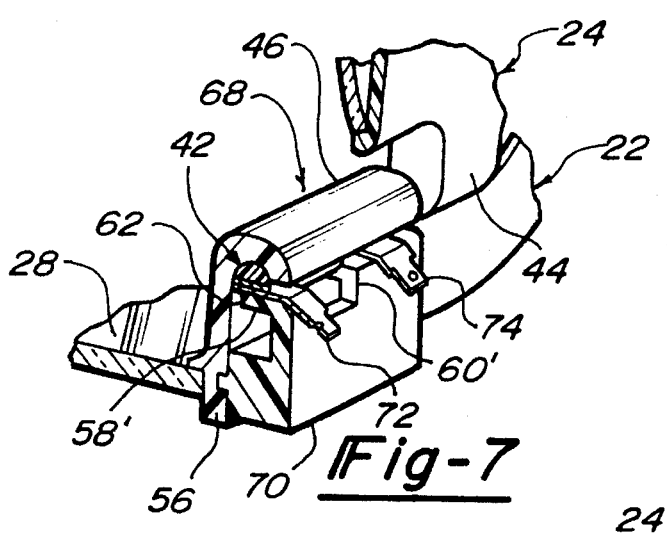
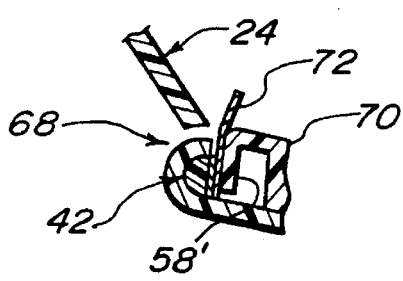
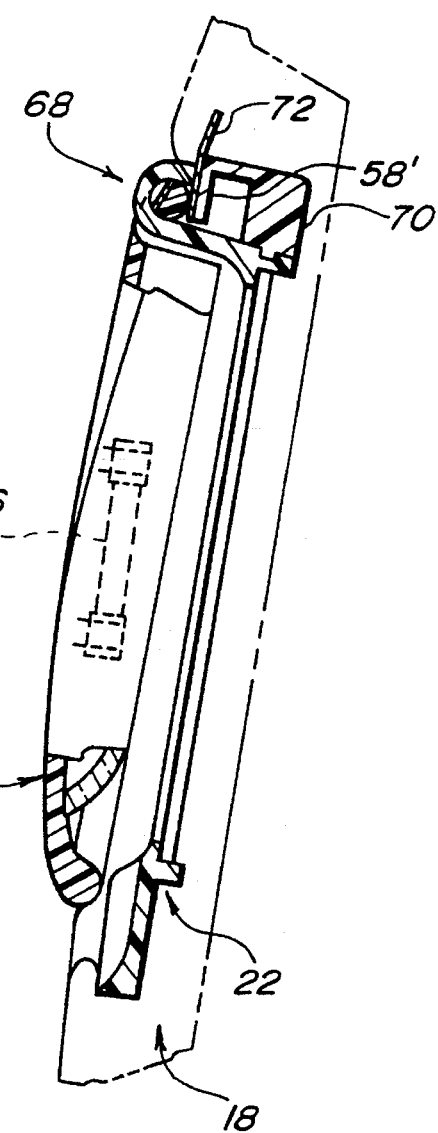

ILLUMINATED VANITY MIRROR ASSEMBLY FOR A VEHICULAR SUN VISOR

BACKGROUND OF THE INVENTION

1. Field of the Invention

This invention relates to vehicular sun visors, and, more particularly, this invention relates to a lighted vanity mirror assembly for a vehicular sun visor.

2. State of the Art

There are a wide variety of vehicular sun visors available, many with a lighted vanity mirror. The various constructions of the mirror and its lighting, with or without a cover, are usually specifically designed for a fiber board body or for a molded body.

While some attention has been directed to easily mounted subassemblies, most efforts have been directed to strictly utilitarian aspects with little or no attempt being made to improve styling or to produce a modular, compact design. All lighting has followed the conventional treatment of being located in the fixed plane of the mirror with the exception of U.S. Pat. No. 4,421,355 which locates the lamps on a pair of doors which open on axes transverse or perpendicular to the longitudinal visor axis in order to space the lights farther apart than "the inter-pupillary spacing between the eyes of an individual".

SUMMARY OF THE PRESENT INVENTION

An objective of the present invention is the demise of the traditional rectangular lighted vanity mirror treatment in vehicular sun visors. The present invention is directed to a modular illuminated vanity mirror assembly which is, in fact, mode and compact, adapting the styling simplicity of the cosmetic compact to produce a striking unit which is a compact vanity mirror case. The resulting unit easily snap fastens to the sun visor body producing a practical and more economical unit with this fresh approach providing user intimacy.

The new vanity mirror assembly includes a base member which mounts in a cavity of the visor body. A vanity mirror is attached to the base member, and a cover is fastened to the base member by a hinge that has an axis of rotation parallel to the longitudinally extending axis of the visor. The light is centrally located in the cover with a lens centrally located in the cover covering the light so that when the visor is swung into a use position, the cover can be swung from a closed position covering the mirror and concealing the light to an open position exposing the mirror for use and allowing the light to illuminate an area to be viewed in the mirror.

With the cover being hinged to the base to swing on an axis parallel to the longitudinal visor axis and with the lighting being located in the cover, a preferred form of the invention is the "compact" look with the base and cover having round perimeters and with the open-presented mirror surface being round even though the mirror blank can economically be square or rectangular in a nonremovable embodiment.

Snap attachment of the assembly to the visor body provides the producer with a choice of a permanent attachment or a readily detachable attachment for use of the compact detached from the visor.

In another preferred embodiment the hinge includes a hinge pin which is connected to the cover. The base member has a bearing cavity that receives the hinge pin to fasten the cover to the base member with a biasing force being exerted by the hinge pin in the bearing cavity to retain the cover in its open and closed positions. The bias force fastening can be easily accomplished with a clip, and in a further refinement, two metal spring clips can be used to provide the fastening with a biasing force and to make an electrical connection through the hinge to the lamp in the cover.

DRAWING

The preferred embodiments of the invention are illustrated in the drawing in which:

FIG. 5 is a plan perspective view;

FIG. 6 is a cross sectional view similar to FIG. 3 showing another embodiment of the hinge structure;

FIG. 7 is a view similar to FIG. 4 showing a partial perspective of the hinge structure of FIG. 6;

FIG. 8 is a partial cross sectional view of the hinge of FIGS. 6 and 7;

DETAILED DESCRIPTION OF THE PREFERRED EMBODIMENTS OF THE INVENTION

Figure 1:
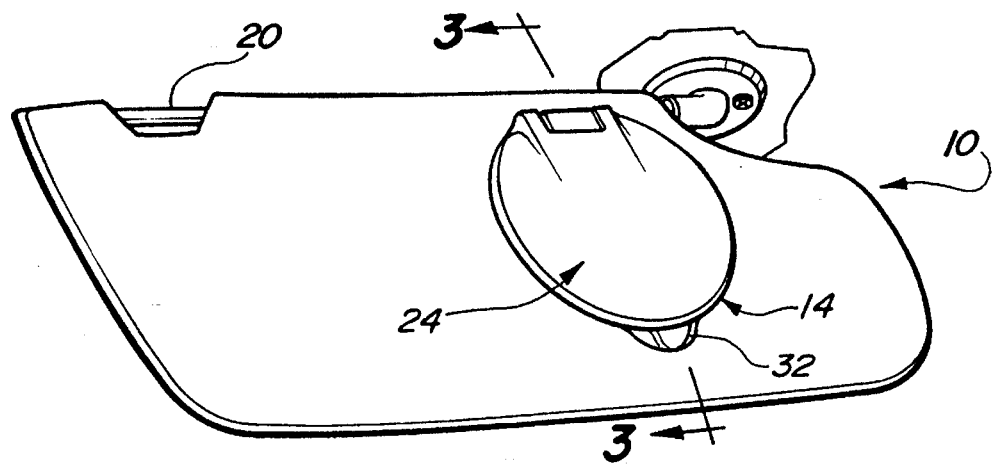
FIG. 1 is a perspective view of a vehicular sun visor incorporating the illuminated vanity mirror assembly of this invention with a cover shown in its closed position.
Figure 2:
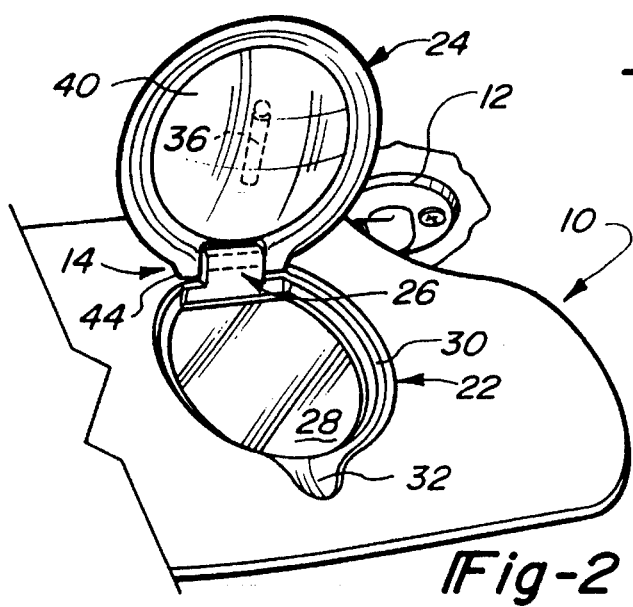
FIG. 2 is a partial perspective view similar to FIG. 1 showing the cover in its open use position.

Referring to FIGS. 1 and 2, a vehicular sun visor 10 is shown in a passenger side embodiment with a pivot rod support 12 being located on the right side. A driver side embodiment will have the pivot rod support on the left side. An illuminated vanity mirror assembly 14 is shown mounted in a cavity 16 of the visor body 18. The visor body typically has a hard board or fiber board core or an injection molded core covered with an upholstery material. The upholstery material typically has a padded backing, particularly in the case of the hard board core.

The sun visor 10 is generally rectangular and is pivoted about a longitudinal extending axis through the pivot rod 12 and a central support rod 20 between a storage position parallel to the vehicle roof or headliner and a downwardly extending, sun shielding, use position.

As seen in FIG. 2, the lighted vanity mirror assembly 14 includes a base member 22 and a cover 24 joined by hinge structure 26. A vanity mirror 28 is attached to the base member 22 and is framed by a bezel portion 30 of the base member 22 when the cover is in its open position as shown in FIG. 2.

Figure 3:
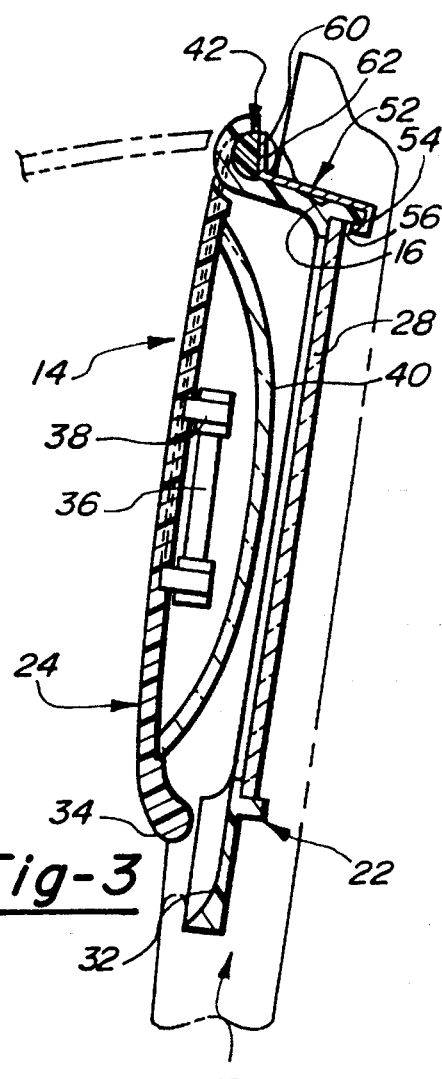
FIG. 3 is a cross sectional view taken along line 3—3 of FIG. 1.

The base has an opening recess 32 allowing the user to lift the cover 24 by a finger inserted under the cover lip 34 as best seen in FIG. 3.

The round periphery of the base member 22, cover 24 and the mirror 28 exposed through the bezel 30 presents the user with the intimacy of a personal compact used for viewing and primping.

Illumination is provided by a bulb 36 mounted in centrally located lamp holder 38 on the cover 24. A lens 40 is centrally located over the lamp holder 38 on the cover 24. The lens 40 distributes the light to the viewing area. As is well known in the art, switching can be provided to supply power to the lamp for lighting only when the visor is in a lowered use position, and when the cover 24 has been opened for viewing.

Figure 4:
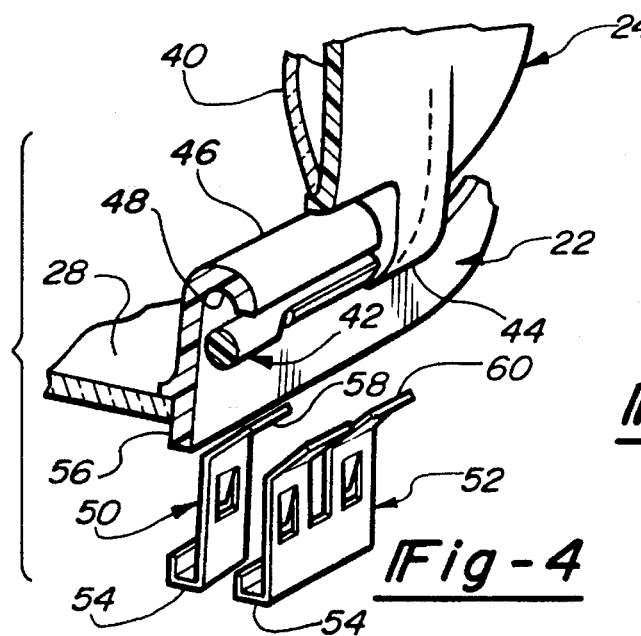
FIG. 4 is an exploded perspective view of a portion of the vanity mirror assembly showing a preferred hinge construction.

Referring to FIGS. 3 and 4, in a preferred embodiment of the invention, the hinge structure 26 is seen as including a hinge pin 42 pivotally attached to a bifurcated portion 44 of cover 24. The base member has a bearing portion 46 which is located in the bifurcated portion 44 of the cover. The bearing portion 46 has a semicylindrical bearing cavity 48 which receives the hinge pin for rotary movement therein.

Spring clips 50 and 52 each have a channel portion 54 which is snapped over and attaches to a rim portion 56 of the base member 22. Clips 50 and 52 also have leg portions 58 and 60 which push against the hinge pin 42 to retain the hinge pin in the bearing cavity 48 with a biasing force. This biasing force will retain the cover in its closed position as shown in FIGS. 1 and 3 and in an open position as shown in FIGS. 2 and 4. The hinge pin may also have a flattened portion 62 which further serves to snap and hold the lid in a given position such as the closed position as shown in FIG. 3 or the open position as shown in FIG. 7.

Spring clips 50 and 52 are metal clips and also serve as electrical connections to carry the vehicle 12 volt power through the hinge pin 42 and cover leads 64 and 66 to the lamp 36 as shown in FIG. 5. The cover leads 64 and 66 are insert molded in the cover 24.

An alternate hinge construction 68 is shown in FIGS. 6–8 in which the metal spring clips 50 and 52 of the embodiments of FIGS. 3 and 4 have been replaced by a single molded plastic clip 70 having resilient leg portions 58' and 60' exerting a biasing force against the hinge pin 42 in the bearing portion 46 of base 22. The clip 70 is fusion welded, cemented or otherwise bonded 15 to the rim portion 56 of base member 22. Electrical connectors 72 and 74 serve to carry the vehicle power through the hinge pin 42 to the cover leads 64 and 66.

Snap mounting of the lighted vanity mirror assembly 14 in the body 18 of the vehicular sun visor 10 is shown in FIGS. 9–13. The visor body illustrated in FIGS. 10–13 is of the hard board type using a chip or fiber board 76 with upholstery covering 78 backed by a foam padding 80. The vanity mirror assembly is mounted by pushing the base member 22 into the cavity or cutout hole 16 in the fiber board 76. Spaced snap connectors 82 on the base member 22 have board attachment lugs 84 and mirror attachment lugs 86 which hold the assembly 14 in the visor body 18 and the mirror 28 positioned.

Figure 13:
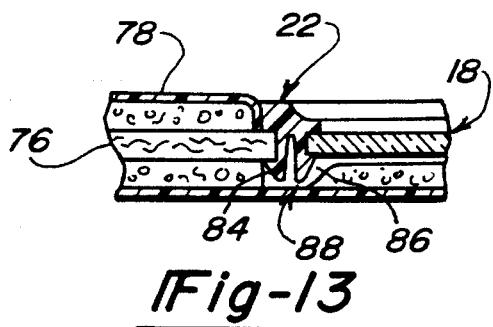
FIG. 13 is a cross sectional view similar to FIGS. 10 and 11 showing an alternate form of base frame locking tabs.

FIG. 13 shows an alternate double prong locking dart form of snap connector 88.

Figure 9:
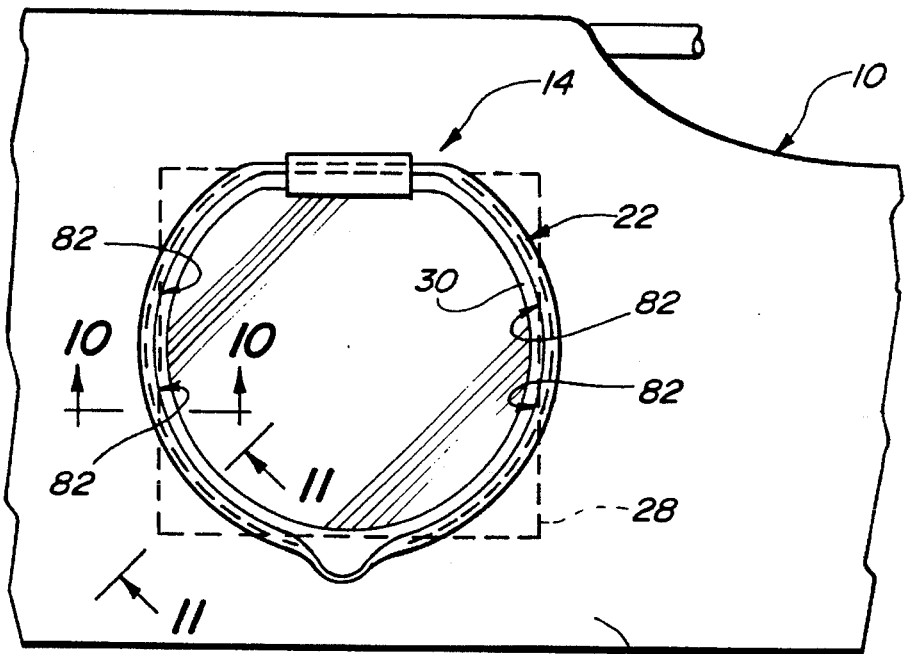
FIG. 9 is a plan view of the visor with the vanity mirror base attached and the lid removed for clarity.
Figure 10:
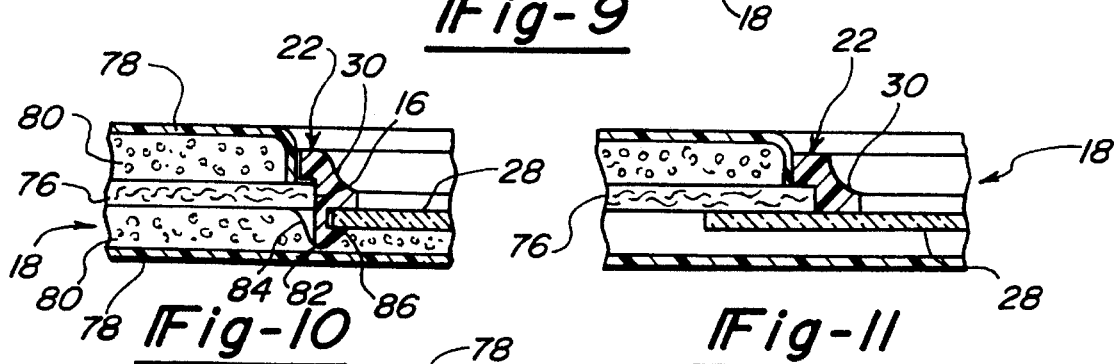
FIG. 10 is a cross sectional view on line 10—10 of FIG. 9.
Figure 11:
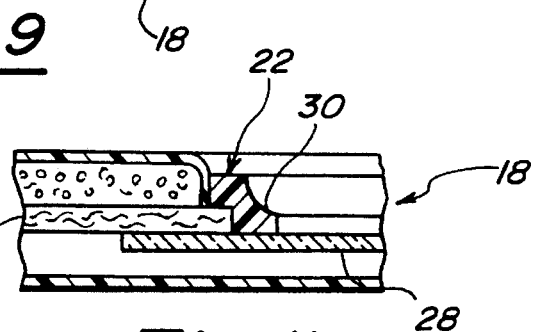
FIG. 11 is a cross sectional view along line 11—11 of FIG. 9.
Figure 12:
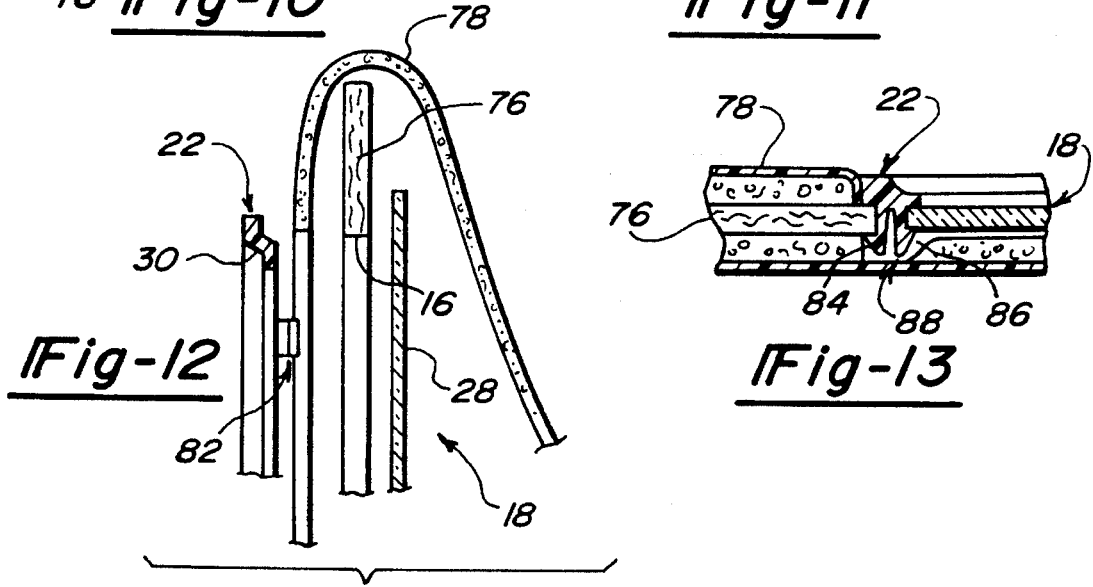
FIG. 12 is an exploded view of a portion of a visor showing the mounting details.

It will be apparent from viewing FIG. 9, that when the lighted vanity mirror assembly is not to be detachably attached to the visor that the mirror 28 can have a square or rectangular shape being held by the snap connectors 82 to present a round mirror face through the bezel 30.

It will be apparent that many modifications can be made without departing from the spirit of the invention as defined by the appended claims.

I claim:

1. An illuminated vanity mirror assembly mounted in a generally rectangular vehicular sun visor body pivotable about a longitudinally extending axis between a storage position and a sun shielding use position, said assembly comprising:

a base member mounted in a cavity of said body;

a vanity mirror attached to said base member;

a cover fastened to said base member by a hinge having an axis of rotation parallel to said longitudinally extending axis, said hinge including a hinge pin connected to said cover; a bearing cavity in said base member; and a clip resiliently biasing said hinge pin into said bearing cavity, and wherein said cover is retained in said open and closed positions by said clip;

a lamp centrally located on said cover;

a lens centrally located on said cover covering said lamp and wherein, said visor body can be swung into said use position, and said cover can be swung from a closed position covering said mirror and concealing said lamp to an open position exposing said mirror for use and allowing said lamp to illuminate an area to be viewed in said mirror.

2. The assembly according to claim 1 wherein said hinge includes an electrical connection for supplying power to said cover for said lamp.

3. The assembly according to claim 2 wherein said clip is a metal spring clip which provides the resilient biasing and said electrical connection.

4. The assembly according to claim 1 including means for snap mounting said assembly in said visor body.

5. The assembly according to claim 1 wherein said base member and cover have a round perimeter, and a round mirror face is exposed through a bezel portion of said base member in the open position of said cover.

6. The assembly according to claim 5 wherein said vanity mirror is mounted as a rectangular blank in said visor body with the bezel portion of said base member overlying said blank.

7. The assembly according to claim 1 wherein electrical leads are insert molded in said cover to supply power to said lamp.

* * * * *